US008660174B2

(12) United States Patent
Fu et al.

(10) Patent No.: US 8,660,174 B2
(45) Date of Patent: Feb. 25, 2014

(54) APPARATUS AND METHOD OF ADAPTIVE OFFSET FOR VIDEO CODING

(75) Inventors: Chih-Ming Fu, Hsinchu (TW);
Ching-Yeh Chen, Taipei (TW); Yu-Wen Huang, Taipei (TW)

(73) Assignee: MediaTek Inc., Hsinchu (TW)

( * ) Notice: Subject to any disclaimer, the term of this patent is extended or adjusted under 35 U.S.C. 154(b) by 463 days.

(21) Appl. No.: 12/987,151

(22) Filed: Jan. 9, 2011

(65) Prior Publication Data

US 2011/0305274 A1   Dec. 15, 2011

Related U.S. Application Data

(60) Provisional application No. 61/354,789, filed on Jun. 15, 2010.

(51) Int. Cl.
*H04N 7/32* (2006.01)
*H04N 7/26* (2006.01)

(52) U.S. Cl.
USPC ..................................... 375/240; 375/E7.243

(58) Field of Classification Search
USPC ........................... 375/240.02, E7.126, E7.076
See application file for complete search history.

(56) References Cited

U.S. PATENT DOCUMENTS

| | | | | |
|---|---|---|---|---|
| 5,021,891 | A * | 6/1991 | Lee | 382/250 |
| 6,996,283 | B2 * | 2/2006 | Thyagarajan | 382/239 |
| 7,245,764 | B2 * | 7/2007 | Nishizawa | 382/168 |
| 8,243,790 | B2 * | 8/2012 | Leontaris et al. | 375/240.02 |

FOREIGN PATENT DOCUMENTS

| | | |
|---|---|---|
| WO | WO 03/103289 A1 | 12/2003 |
| WO | WO 2004/054270 A1 | 6/2004 |
| WO | WO 2007/081713 A1 | 7/2007 |
| WO | WO 2007/081908 A1 | 9/2007 |

OTHER PUBLICATIONS

McCann et al, entitled "Samsung's Response to the Call for Proposals on Video Compression Technology", Document: JCTVC-A124, Joint Collaborative Team on Video Coding (JCT-VC) of ITU-T SG16 WP3 and ISO/IEC JTC1/SC29/WG11, 1st Meeting: Dresden, DE, Apr. 15-23, 2010.

(Continued)

*Primary Examiner* — Jay Patel
*Assistant Examiner* — Reza Aghevli
(74) *Attorney, Agent, or Firm* — Blairtech Solution LLC

(57) ABSTRACT

The method selects a region for processed video data and determines a class for each pixel in the region of the processed video data based on characteristic measurement of said each pixel. The processed video data corresponds to the reconstructed, deblocked reconstructed or deblocked-and-loop-filtered reconstructed video data. An intensity offset is then determined for the class according to the pixels in the region of the processed video data and respective pixels in a respective region of associated original video data. The intensive offset determined is applied to the processed video data to compensate the intensity offset. The region is smaller than a picture so that adaptive offset can adapt to dynamic characteristics of a picture. In one embodiment, the characteristic measurement is based on pixel patterns consisting pixels around an underlying pixel.

32 Claims, 6 Drawing Sheets

(56) References Cited

OTHER PUBLICATIONS

Ken Mccann et al: "Samsung's Response to the Call for Proposals on Video Compression Technology", Joint Collaborative Team on Video Coding (JCT-VC) of ITU-T SG16 WP3 and ISO/IEC JTC1/SC29/WG11 1st Meeting: Dresden, DE, Apr. 15-23, 2010, DocumentJCTVC-A124_r1, Apr. 13, 2010.

Joaquin Lopez et al: "Block-Based Illumination Compensation and Search Techniques for Multiview Video Coding", Proceedings of the Picture Coding Symposium, Dec. 15, 2004.

Yanfei Shen et al: "Adaptive weighted 1-28 prediction in video coding". 2004 IEEE International Conference on Multimedia and Expo: Jun. 27-30, 2004. Taipei. Taiwan, IEEE Operations Center. Piscataway, NJ. val. 1. Jun. 27, 2004. pp. 427-430, XP010770802. DOI: 10.1109/ICME.2004.1394220 ISBN: 978-0-7803-8603-7.

Mccann (Zetacast I Samsung) K et al: 1-28 "Video coding technology proposal by Samsung (and BBC)", 1. JCT-VC Meeting; Apr. 15, 2010-Apr. 23, 2010; Dresden; (Jointcollaborative Team on Video Coding of ISO/IEC JTC1/SC29/WG11 and ITU-TSG.16 ); URL: http://wftp3.itu.int/av-arch/jctvc-site/,, Apr. 16, 2010, XP030007574, ISSN: 0000-0049.

European Search Report for an associated application in EPC No. 11159199.6-2223/2458862.

* cited by examiner

APPARATUS AND METHOD OF ADAPTIVE OFFSET FOR VIDEO CODING

CROSS REFERENCE TO RELATED APPLICATIONS

The present invention claims priority to U.S. Provisional Patent Application, No. 61/354,789, filed Jun. 15, 2010, entitled "Adaptive Restoration Method in Video Coding. The U.S. Provisional Patent Application is hereby incorporated by reference in its entirety.

FIELD OF THE INVENTION

The present invention relates to video processing. In particular, the present invention relates to apparatus and method for adaptive offset restoration.

BACKGROUND

Video data in a digital format offers many advantages over the conventional analog format and has become the dominant format for video storage and transmission. The video data is usually digitized into an integer represented by a fixed number of bits, such as 8 bits or 10 bits per sample. Furthermore, color video data is often represented using a selected color system such as a Red-Green-Blue (RGB) primary color coordinates or a luminance-chrominance system. One of the popularly used luminance-chrominance color system used in digital video is the well-known YCrCb color system, where Y is referred to as the luminance component and Cr and Cb are referred to as the chrominance components. The RGB components and the Y component are associated with the intensity of the primary colors and the luminance respectively, and their digital representation is often mapped to an integer having a range associated with the number of bits of the digital representation. For example, an 8-bit video data usually represents an intensity level 0 to 255. On the other hand, the chrominance components, Cr and Cb, correspond to difference data and their digital representation is often mapped to an integer having negative and positive values. For example, an 8-bit Cr/Cb data represents a chrominance level from −128 to +127.

Along the processing path in a digital video system, the mean value of the processed video may be shifted which causes intensity offset. The intensity shifting may be caused by filtering, data rounding, quantization or other processing. Intensity shift, also called intensity offset, may cause visual impairment or artifacts, which is especially noticeable when the intensity shift varies from frame to frame. Therefore, the pixel intensity offset has to be carefully restored to avoid the potential problems mentioned above. However, picture contents often are very dynamic within a frame. In order to explore dynamic content characteristics within a picture, it is desirable to develop an apparatus and method for adaptive offset restoration that can be applied to a region of picture. Furthermore, it is desired to explore offset restoration adapted to pixel characteristics by classifying characteristics of an underlying pixel in the region into classes. Therefore, offset restoration can be performed adaptively for each class.

BRIEF SUMMARY OF THE INVENTION

An apparatus and method for adaptive offset restoration are disclosed. The method according to the present invention comprises receiving the processed video data, selecting a region for the processed video data, determining a class for each of pixels in the region of the processed video data based on characteristic measurement of said each of the pixels, determining intensity offset for the class according to the pixels in the region of the processed video data and respective pixels in a respective region of associated original video data, and compensating the processed video data based on the intensity offset for the class. The region may be smaller than a picture so that adaptive offset can adapt to dynamic characteristics of a picture. The adaptive offset restoration may be applied to reconstructed video data before deblocking processing. In one embodiment according to the present invention, the characteristic measurement is based on pixel patterns consisting pixels around an underlying pixel and the characteristic measurement is related edge, peak and valley at the underlying pixel. In another embodiment according to the present invention, the characteristic measurement is based on the intensity of the underlying pixel and the intensity is partitioned into multiple bands for classification. In yet another embodiment according to the present invention, the adaptive offset shares the same pixel classification as adaptive loop filter.

An apparatus and method for decoding of a video bitstream, wherein reconstructed video pictures corresponding to the video bitstream are processed by adaptive offset, are disclosed. The method for decoding of a video bitstream, wherein reconstructed video pictures corresponding to the video bitstream are processed by adaptive offset, comprises processing the video bitstream to reconstruct video pictures and to provide processed video pictures, selecting a region for the processed video pictures, determining a class for each of pixels in the region of the processed video pictures based on characteristic measurement of said each of the pixels, determining intensity offset for the class as indicated in the video bitstream, and compensating the region of the processed video pictures based on the intensity offset for the class. The region may be smaller than a picture so that adaptive offset can adapt to dynamic characteristics of a picture. The adaptive offset restoration may be applied to reconstructed video data before deblocking processing. In one embodiment according to the present invention, the characteristic measurement is based on pixel pattern consisting pixels around an underlying pixel and the characteristic measurement is related edge, peak and valley at the underlying pixel. In another embodiment according to the present invention, the characteristic measurement is based on the intensity of the underlying pixel and the intensity is partitioned into multiple bands for classification. In yet another embodiment according to the present invention, the adaptive offset shares the same pixel classification as adaptive loop filter.

DETAILED DESCRIPTION OF THE INVENTION

Video data in a digital format offers many advantages over the conventional analog format and has become the dominant format for video storage and transmission. The video data is usually digitized into an integer represented by a fixed number of bits, such as 8 bits or 10 bits per sample. Furthermore, color video data is often represented using a selected color system such as a Red-Green-Blue (RGB) primary color coordinates or a luminance-chrominance system. One of the popularly used luminance-chrominance color system used in digital video is the well-known YCrCb color system, where Y is referred to as the luminance component and Cr and Cb are referred to as the chrominance components. The RGB components and the Y component are associated with the intensity of the primary colors and the luminance respectively, and their digital representation is often mapped to an integer having a range associated with the number of bits of the digital representation. For example, an 8-bit video data usually represents an intensity level 0 to 255. On the other hand, the chrominance components, Cr and Cb, correspond to difference data and their digital representation is often mapped to an integer having negative and positive values. For example, an 8-bit Cr/Cb data represents a chrominance level from −128 to +127.

Along the processing path in a digital video system, the mean value of the processed video may be shifted which causes intensity offset. The intensity shifting may be caused by filtering, data rounding, quantization or other processing. Intensity shift, also called intensity offset, may cause visual impairment or artifacts, which is especially noticeable when the intensity shift varies from frame to frame. Therefore, the pixel intensity has to be carefully offset corrected to avoid the potential problems mentioned above. However, picture contents often are very dynamic between frames and within a frame and change from time to time. In order to explore the advantage of content adaptive pixel processing in a dynamic video environment, it is desirable to develop a system and method that can select a picture unit, termed predefined set, for the underlying video data to further improve the quality of processed video data. The predefined set can be selected to capture the dynamic characteristics of the underlying video data.

Figure 1:
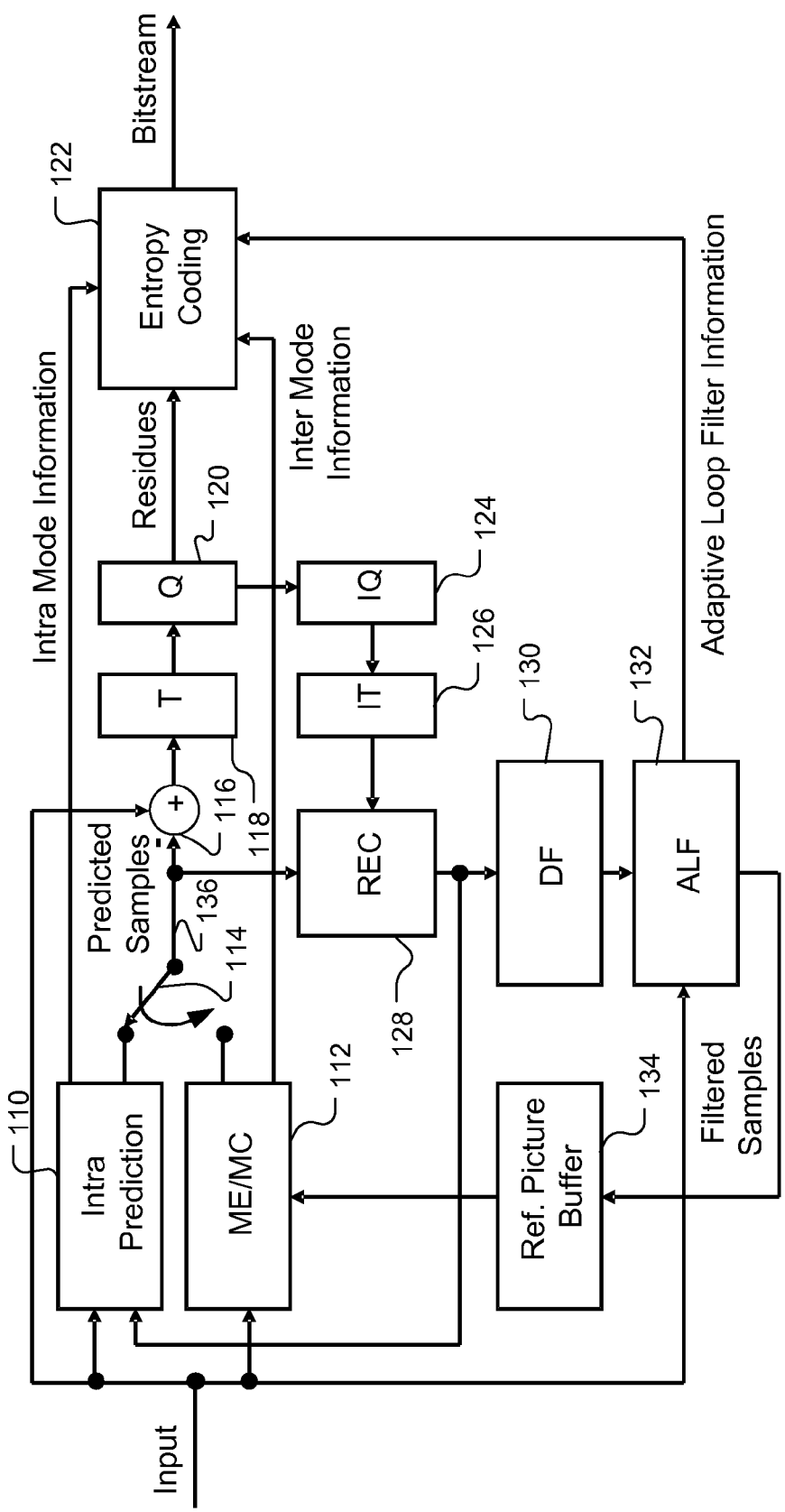
FIG. 1 illustrates a system block diagram of an exemplary video encoder for high efficiency video coding.

The exemplary encoder shown in FIG. 1 represents a system using intra/inter-prediction. Intra-prediction 110 is responsible to provide prediction data based on video data in the same picture. For inter-prediction, motion estimation (ME) and motion compensation (MC) 112 is used to provide prediction data based on video data from other picture or pictures. Switch 114 selects intra-prediction or inter-prediction data and the selected prediction data are supplied to adder 116 to form prediction errors, also called residues. The prediction error is then processed by transformation (T) 118 followed by quantization (Q) 120. The transformed and quantized residues are than coded by entropy coding 122 to form a bitstream corresponding to the compressed video data. The bitstream associated with the transform coefficients is then packed with side information such as motion, mode, and other information associated with the image area. The side information may also be subject to entropy coding to reduce required bandwidth and accordingly the data associated with the side information are provided to entropy coding 122 as shown in FIG. 1. When an inter-prediction mode is used, a reference picture or reference pictures have to be reconstructed at the encoder end. Consequently, the transformed and quantized residues are processed by inverse quantization (IQ) 124 and inverse transformation (IT) 126 to recover the residues. The residues are then added back to prediction data 136 at reconstruction (REC) 128 to reconstruct video data. The reconstructed video data may be stored in reference picture buffer 134 and used for prediction of other frames. However, deblocking filter 130 and adaptive loop filter 132 are applied to the reconstructed video data before the video data are stored in the reference picture buffer in order to improve video quality. The adaptive loop filter information may have to be transmitted in the bitstream so that a decoder can properly recover the required information in order to apply the adaptive loop filter. Therefore, adaptive loop filter information from ALF 132 is provided to entropy coding 122 for incorporation into the final bitstream. As it is shown in FIG. 1, incoming video data undergo a series of processing in the encoding system and the reconstructed video data from REC 128 may be subject to intensity offset due to the series of processing. The reconstructed video data are further processed by deblocking 130 and adaptive loop filter 132, which may cause further intensity offset. Accordingly, it is desired to incorporate offset restoration, also called offset correction, to restore the intensity offset.

Figure 2:
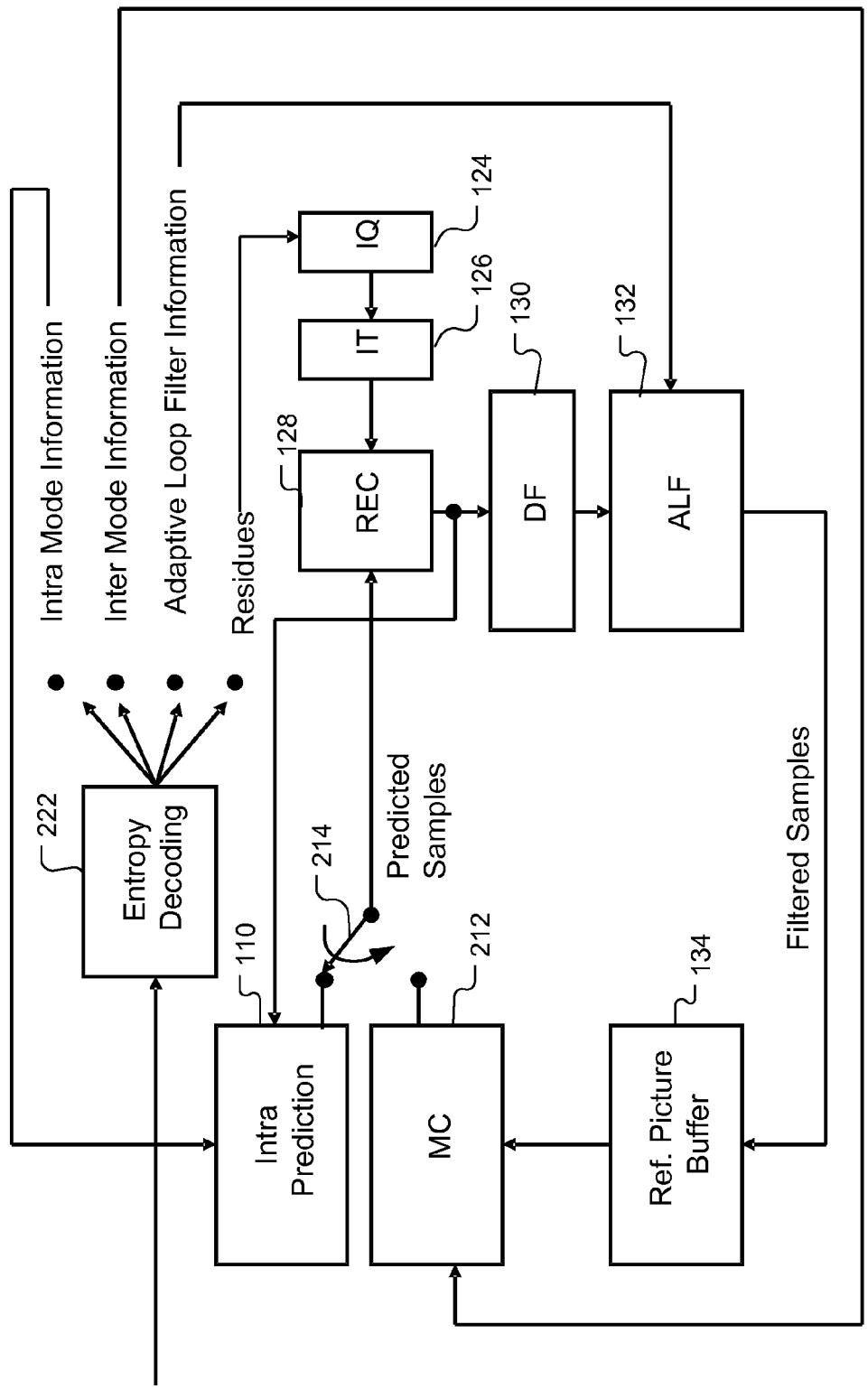
FIG. 2 illustrates a system block diagram of an exemplary video decoder for high efficiency video coding.

FIG. 2 illustrates a system block diagram of a video decoder for high efficiency video coding. Since the encoder also contains parts for reconstructing the video data, some decoder parts are already used in the encoder. However, the entropy decoder 222 is not used by the encoder. Furthermore, only motion compensation 212 is required for the decoder side. The switch 214 selects intra-prediction or inter-prediction and the selected prediction data are supplied to reconstruction (REC) 128 to be combined with recovered residues. Besides performing entropy decoding for compressed video data, entropy decoding 222 is also responsible for entropy decoding of side information and provides the side information to respective blocks. For example, intra mode information is provided to intra-prediction 110, inter mode information is provided to motion compensation 212, adaptive loop filter information is provided to ALF 132 and residues are provided to inverse quantization 124. The residues are processed by IQ 124, IT 126 and subsequent reconstruction process to reconstruct the video data. Again, as it is shown in FIG. 2, reconstructed video data from REC 128 undergo a series of processing including IQ 124 and IT 126 and are subject to intensity offset. The reconstructed video data are further processed by deblocking filter 130 and adaptive loop filter 132, which may cause further intensity offset. Accordingly, it is desired to incorporate offset correction to compensate the intensity offset.

Figure 3:
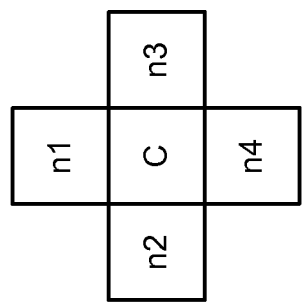
FIG. 3 illustrates an example of adaptive offset based on pixel category, where the category is determined according to pixel C and its neighboring pixels n1-n4.

In order to overcome the offset problems, McCann et al. disclosed a content adaptive extreme correction and band correction in "Samsung's Response to the Call for Proposals on Video Compression Technology", Document: JCTVC-A124, Joint Collaborative Team on Video Coding (JCT-VC) of ITU-T SG16 WP3 and ISO/IEC JTC1/SC29/WG11, 1st Meeting: Dresden, Del., 15-23 Apr., 2010. The use of content information based on neighboring pixels can explore local edge characteristics and may result in improved performance in terms of better visual quality or bit rate reduction. McCann et al. disclosed a neighboring pixel configuration as shown in FIG. 3, where C is the current pixel value and n1 through n4 are four neighboring pixels on the top, left, right and bottom sides of the current pixel respectively. The method to classify pixels into seven categories according to McCann et al. is shown in the following table:

| Category | Condition | Note |
|---|---|---|
| 0 | C < 4 neighbors | Local min |
| 1 | C < 3 neighbors && C = $4^{th}$ neighbor | Object edge |
| 2 | C < 3 neighbors && C > $4^{th}$ neighbor | Object edge |
| 3 | C > 3 neighbors && C < $4^{th}$ neighbor | Object edge |
| 4 | C > 3 neighbors && C = $4^{th}$ neighbor | Object edge |
| 5 | C > 4 neighbors | Local max |
| 6 | None of the above | Other |

For category 0, the pixel C is a local minimum, also called a valley. For category 5, the pixel C is a local maximum, also called a peak. For categories 1, 2, 3 and 4, the pixel C is at an object edge. For pixels in each category, the difference between the mean of processed video data and the mean of original video data is computed and transmitted to the decoder. The processed video data can be the reconstructed video data from REC 128, the deblocked data from DF 130 or the adaptive loop filtered data from ALF 132. McCann et al. classify the edge characteristics into "categories", which are also termed as "classes". While FIG. 1 and FIG. 2 illustrate exemplary systems that adaptive offset for video coding can be applied, other systems may also embody the present invention to overcome the intensity offset issue. For example, in the camera image processing system, video data processed by demosaicing, white balancing, and/or edge enhancement may also be subject to intensity offset. As disclosed above, McCann et al. apply a first intensity offset correction to processed data between DF 130 and ALF 132 according to edge characteristic of underlying pixel. The adaptive offset correction based on the edge characteristic of underlying pixel is termed as Extreme Correction (EXC) by McCann et al.

According to McCann et al., the above extreme correction is applied to reconstructed video data. The reconstructed mean intensity value Vr(c) corresponding to class c and the original mean intensity value Vo(c) corresponding to class c are determined for a video picture. The offset Vd(c) corresponding to class c can be determined according to:

$$Vd(c)=Vo(c)-Vr(c).$$

The offset Vd(c) as computed above is added to the reconstructed video data belonging to class c, i.e., Vr'(c)=Vr(c)+Vd(c), where Vr'(c) is the offset corrected video data. In order for a decoder to apply the proper offset for respective classes, the offset Vd(c) values for all classes have to be transmitted to the decoder. Proper bitstream syntax will be needed to incorporate the offset Vd(c) values.

Figure 4:
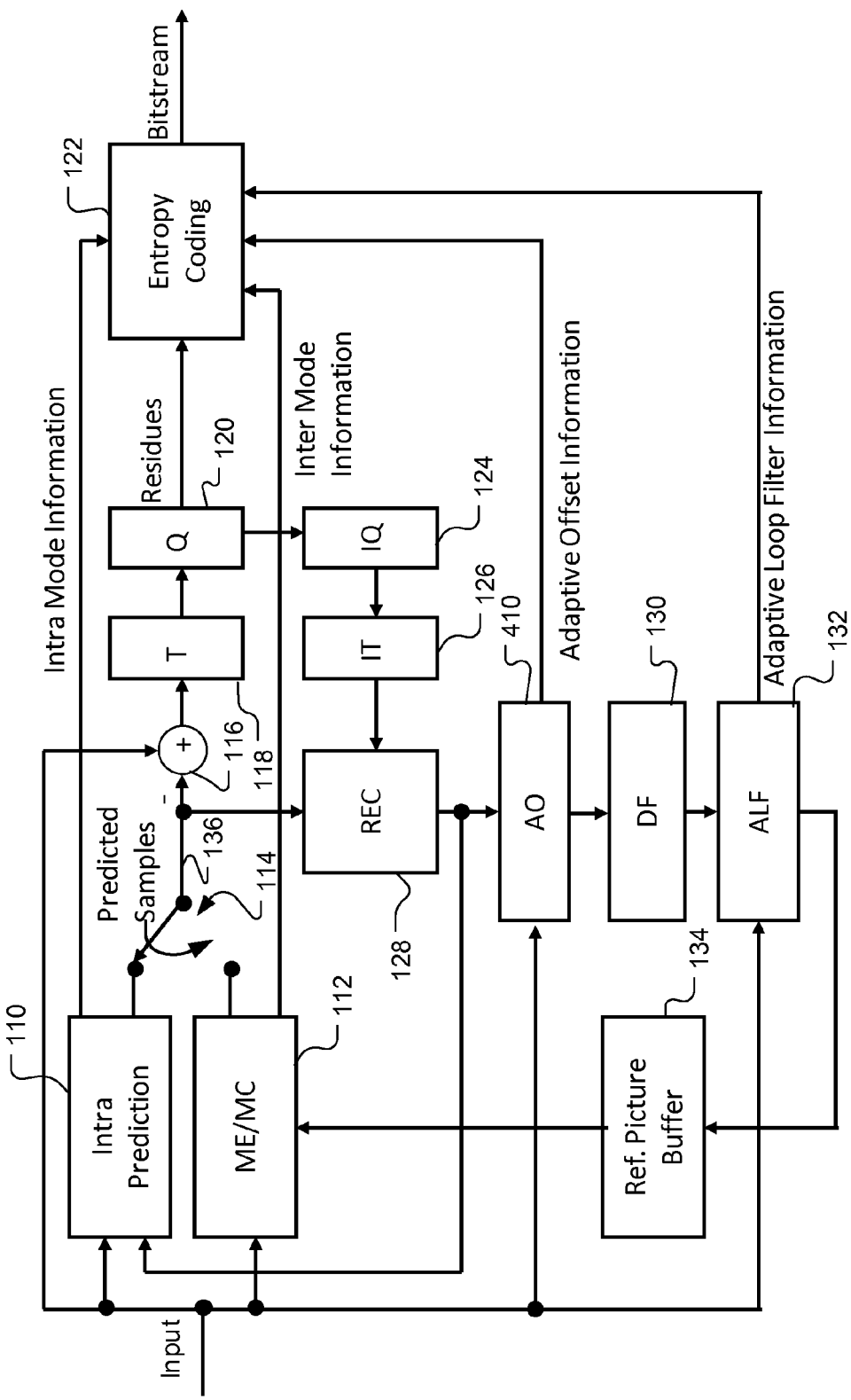
FIG. 4 illustrates a system block diagram of a video encoder for high efficiency video coding embodying adaptive offset restoration according to an embodiment of the present invention.

While McCann et al. apply extreme correction to processed video data between DF 130 and ALF 132, and applied band correction to processed data between ALF 132 and reference picture buffer 134, adaptive offset correction may also be applied to reconstructed data before the DF 130 is applied. FIG. 4 illustrates an embodiment according to the present invention where adaptive offset is applied to processed video data between reconstruction 128 and DF 130.

McCann et al. disclosed another adaptive offset correction according to the band that an underlying pixel belongs to. This method is also termed as band correction (BDC). According to McCann et al., the main motivation of band-based classification is to equalize two different Probability Density Functions (PDFs) of underlying data corresponding to the reconstructed video data and the original video data. McCann et al. disclosed a band-based classification by using the p most significant bits of the pixels, which is equivalent to dividing the intensity into $2^p$ classes having uniform intervals. In one implementation, McCann et al. selected p=4 to divide the intensity into 16 equally spaced bands, also termed as classes. For each band or class, the mean difference is computed and transmitted to the decoder and the offset can be corrected individually for each band. The reconstructed mean intensity value Vr(c) corresponding to band c or class c and the original mean intensity value Vo(c) corresponding to band c or class c are determined for a video picture. The same mathematical symbols Vr(c) and Vo(c) for EXC have been used for convenience. As in the adaptive offset correction based on edge characteristics, the offset Vd(c) associated corresponding to class c can be determined according to Vd(c)=Vo(c)−Vr(c). The offset Vd(c) as computed above is then added to the reconstructed video data belonging to class c, i.e., Vr'(c)=Vr(c)+Vd(c), where Vr'(c) is the offset corrected video data. McCann et al. apply band correction to processed video data between ALF 132 and reference picture buffer 134.

While McCann et al. disclosed adaptive processing based on characteristics related to neighboring pixels or intensity band, there is no adaptivity to explore the dynamic characteristics within a picture, where the characteristics of one picture area may be very different from the characteristics of another picture area. In the method by McCann et al., the category or band determination is always based on a whole frame or a group of pictures. For some video data, a region corresponding to a smaller picture area may be more advantageous for adaptive processing because the category or band associated with a smaller picture area may better characterize the underlying video data in the region. However, a smaller picture area may require more overhead information, such as the intensity offset information in the example disclosed by McCann et al. needs to be transmitted to the decoder. Therefore, there is a tradeoff between the potential performance improvement and the increase of overhead information associated with smaller picture areas. Accordingly, the pixel intensity processing disclosed in this disclosure utilizes a smaller picture area, termed as a region, in this disclosure. The size of region can be independent of the picture area used for respective video processing such as video compression in a compression system or sensor image processing in a digital camera. Furthermore, the region can be adaptively configured from picture to picture. In this disclosure, adaptive offset (AO) is also used as an abbreviation for adaptive offset correction or adaptive offset restoration.

In another embodiment of the present invention, the AO is further combined with the ALF. For each region of the picture, AO, ALF or a combination of AO and ALF can be applied to the region adaptively. When AO and ALF are selectively applied to a region, the average decoding time can be reduced without sacrificing the coding efficiency. In order to signal whether AO, ALF or a combination of AO and ALF is applied to the region, a flag may be used for the region to indicate the selection.

Figure 5A:
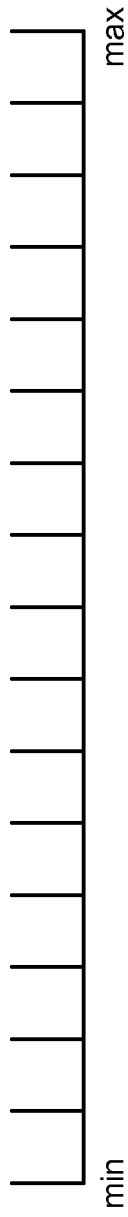
FIG. 5A illustrates an example of dividing the intensity range into sixteen equally spaced bands.
Figure 5B:
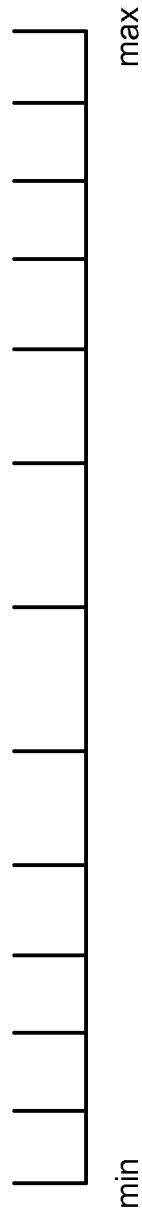
FIG. 5B illustrates an example of dividing the intensity range into twelve non-uniform bands.

While McCann et al. disclosed band correction using uniform intervals for a whole picture, an embodiment according to the present invention discloses advanced band classification based on a region of a picture. The picture is first divided into partitions either using blocks of fixed size or using a quadtree. Each partition of the division is also called a region as in the AO case described above. Pixels in each region are then divided into multiple bands according to an advanced band classification method. The advanced band classification adaptively selects one band classification from uniform 16 bands as shown in FIG. 5A or non-uniform 12 bands as shown in FIG. 5B. The selection of band classification type can be region by region and a flag is required to indicate the selection. The minimum and maximum of the intensity can be derived from the reconstructed video data for the region. Therefore, the minimum and maximum may not be required to communicate to the decoder. The band offsets for each region are transmitted to the decoder side so that the decoder can properly correct the band offset for each band of the region. The offset restoration method based on advanced band classification is termed as band offset restoration or band offset (BO) in short. While two types of bands are used as an exemplary embodiment to practice the present invention in the above example, more types of bands may be used. While uniform 16 bands and non-uniform 12 bands are used as the two exemplary types of bands, the numbers of bands used by the two exemplary types of bands are not limitations of the present invention. The uniform and non-uniform band types may use more or less bands to practice the present invention.

While two types of bands, i.e., uniform 16 bands and non-uniform 12 bands, are disclosed above, an alternative band classification can be used for band offset correction. This alternative band classification classifies pixels in the region into N bands. The N bands are then divided into two groups where one group is designated for offset correction and the other group is designated for no offset correction. For example, pixels in the region can be divided into 32 uniform bands. The central 16-band partition covering [64, 191] can be assigned to a first group, and the rest 16 bands covering the rest intensities can be assigned to a second group. The decision for a group for offset correction or not can be made on a region by region basis. While two groups are used as an example to practice the invention, more groups can be used. For example, the N bands may be divided into M groups where M is an integer larger than or equal to 2. Among the M groups, P groups can be designated for no offset correction, where P is smaller than or equal to M. Consequently, only the remaining (M−P) groups are subject to offset correction and intensity offsets for these (M−P) groups need to be provided to a decoder for offset correction.

Figure 6A:
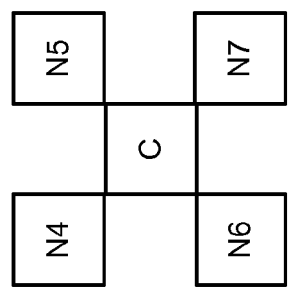
FIG. 6A illustrates a configuration of a current pixel and its neighboring pixels for pixel category determination.
Figure 6B:
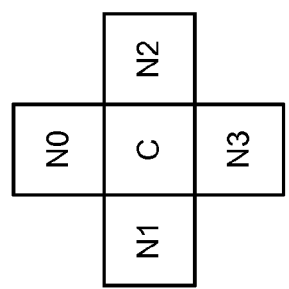
FIG. 6B illustrates an alternative configuration of a current pixel and its neighboring pixels for pixel category determination.
Figure 7A:
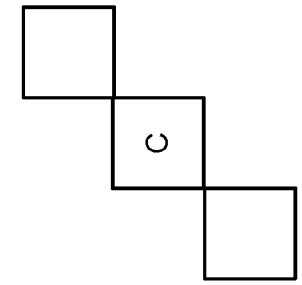
FIGS. 7A-D illustrate various linear configurations of a current pixel and its neighboring pixels for pixel category determination.
Figure 7B:
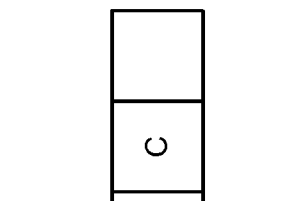
Figure 7C:
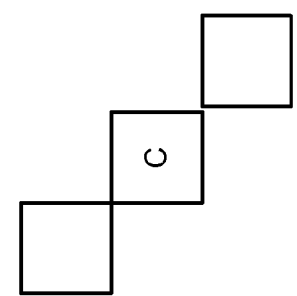
Figure 7D:
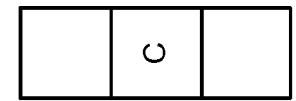

While McCann et al. disclosed adaptive processing related to edge characteristics of an underlying pixel and the pixel classification is based on a whole picture, an embodiment according to the present invention selects pixel configuration or pixel pattern to measure edge characteristics adaptively on a region by region basis. A flag is used for each region to transmit the selection of pixel configuration for edge characteristics determination. The region may be resulted by dividing a picture using fixed-size block or quadtree partition. Besides the pixel configuration disclosed by McCann et al. as shown in FIG. 6A, an additional pixel configuration as shown in FIG. 6B may also be selected. The cross pixel configuration or cross pixel pattern shown in FIG. 6A is more responsive to horizontal edges or vertical edges. Besides, the pixel pattern is also responsive to a peak or a valley at the underlying pixel. On the other hand, the diagonal pixel configuration of FIG. 6B is more responsive to slant edges at 45° or 135° as well as a peak or a valley at the underlying pixel. The adaptive method also classifies pixels into seven categories as shown in the following table:

| Category | Condition | Note |
|---|---|---|
| 0 | $C < 4$ neighbors | Local min |
| 1 | $C < 3$ neighbors && $C = 4^{th}$ neighbor | Edge |
| 2 | $C < 3$ neighbors && $C > 4^{th}$ neighbor | Edge |
| 3 | $C > 3$ neighbors && $C < 4^{th}$ neighbor | Edge |
| 4 | $C > 3$ neighbors && $C = 4^{th}$ neighbor | Edge |
| 5 | $C > 4$ neighbors | Local max |
| 6 | None of the above | Other |

The above classification into 7 categories based on pixel pattern is used as an example to practice the present invention and is not construed as limitations to the present invention. More or less categories may be used and other pixel patterns may also be used to practice the present invention. While two-dimensional pixel configurations are disclosed above to determine edge characteristics, simplified linear pixel configurations using two neighboring pixels may also be used. The use of simplified pixel configuration will reduce the required computation. Accordingly, four simplified pixel configurations, also called pixel patterns, are disclosed as shown in FIGS. 7A-7D corresponding to vertical line, horizontal line, 135° slant line and 45° slant line respectively. Each pixel configuration arranged as a short line is responsive to intensity transition along the line. For example, a horizontal edge will cause a more noticeable intensity transition in the vertical line than lines having other orientations. Similarly, a vertical edge will cause more noticeable intensity transition in the horizontal line than lines having other orientation. The selection of pixel configuration can be determined on a region by region basis and a flag is required for each region. Based on the pixel configuration, an underlying pixel is classified into 6 classes corresponding to edges, peak, valley and none of the above as shown in the following table:

| Category | Condition | Note |
|---|---|---|
| 0 | $C < 2$ neighbors | Local min |
| 1 | $C < 1$ neighbor && $C = 1$ neighbor | Edge |
| 2 | $C > 1$ neighbor && $C < 1$ neighbor | Edge |
| 3 | $C > 1$ neighbor && $C = 1$ neighbor | Edge |
| 4 | $C > 2$ neighbors | Local max |
| 5 | None of the above | Other |

While 2 pixels around an underlying pixel are used to form a short-line pixel pattern, more pixels along the linear direction can be used. For example, two pixels on each side of the underlying pixel can be used to form pixel pattern corresponding to a 5-pixel line. Again, more or less categories may be used to practice the present invention.

The ALF processing used in high efficiency video coding (HEVC) also uses pixel classification to select a respective filter. ALF usually uses sum of Laplacians to determine a class for an underlying pixel. In yet another embodiment according to the present invention, Adaptive offset may share the same classification as ALF. In other words, adaptive offset will adopt the region used by ALF, which may be a largest coding unit, a slice, a slice group or other partial picture. The sum of Laplacians will be used by adaptive offset as the characteristic measurement to determine the class for an underlying pixel. Accordingly, the offset for each class in the region will be determined and be provided to a decoder. Similarly, ALF may share the same classification as BO/BDC where BO/BDC classifies pixels in a region into classes based on pixels intensity.

While edge characteristics and intensity band are used as the characteristics to classify an underlying pixel into classes, other characteristics may also be used to classify an underlying pixel into classes. For example, coding unit modes, prediction unit sizes, transform unit sizes, quantization parameters, reference pictures, motion vectors, intra prediction modes, residues, and deblocking boundary strengths can be used as the characteristics to classify an underlying pixel into classes. For example, each pixel is classified into a category or class based on sum of Laplacians. Accordingly, the intensity offset for each category or class can be calculated and used to correct offset for respective category or class.

Embodiment of adaptive offset restoration according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

Embodiments of adaptive offset restoration according to the present invention as described above may be implemented in integrated hardware or in multiple processing units, where each processing unit may be responsible for a certain function of adaptive offset restoration. For example, a first processing unit may be configured to determine a class for each of pixels in the region of the processed video data based on characteristic measurement of said each of the pixels. A second processing unit may be configured to determine intensity offset for the class according to the pixels in the region of the processed video data and respective pixels in a respective region of associated original video data. A third processing unit may be configured to compensate the region of the processed video data based on the intensity offset for the class. The above example of hardware implementation based on multiple processing units illustrates one mapping between system functions and processing units. Nevertheless, the specific functional partition and hardware mapping should not be construed as limitations to the present invention. A skilled person in the field may practice the present invention by using different partition according to system functions and mapping the functions into different hardware processing units. Embodiments of adaptive offset restoration in a decoding system according to the present invention as described above may also be implemented in integrated hardware or in multiple processing units, where each processing unit may be responsible for a certain function of adaptive offset restoration. For example, a first processing unit may be configured to reconstruct video pictures from the video bitstream and to provide processed video pictures. A configuration unit may be used to configure a region for the processed video pictures. A second processing unit may be configured to determine a class for each of pixels in the region of the processed video pictures based on characteristic measurement of said each of the pixels. A third processing unit may be configured to determine intensity offset for the class as indicated in the video bitstream. A fourth processing unit may be configured to compensate the region of the processed video pictures based on the intensity offset for the class. The above example of hardware implementation for a decoder system based on multiple processing units illustrates one mapping between system functions and processing units. Nevertheless, the specific functional partition and hardware mapping should not be construed as limitations to the present invention. A skilled person in the field may practice the present invention by using different partition according to system functions and mapping the functions into different hardware processing units.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for adaptive offset processing of reconstructed, deblocked reconstructed, or deblocked-and-loop-filtered reconstructed video data, the method comprising:
   receiving the reconstructed, deblocked reconstructed, or deblocked-and-loop-filtered reconstructed video data;
   selecting a region for the reconstructed, deblocked reconstructed, or deblocked-and-loop-filtered reconstructed video data;
   determining a class for each of pixels in the region of the reconstructed, deblocked reconstructed, or deblocked-and-loop-filtered reconstructed video data based on characteristic measurement of said each of the pixels;
   determining intensity offset for the class according to the pixels in the region of the reconstructed, deblocked reconstructed, or deblocked-and-loop-filtered reconstructed video data and respective pixels in a respective region of associated original video data; and
   compensating intensities of the pixels in the region of the reconstructed, deblocked reconstructed, or deblocked-and-loop-filtered reconstructed video data based on the intensity offset for the class;
   wherein said determining a class for each of pixels in the region comprises dividing pixel intensity into N bands between a minimum value and a maximum value, wherein N is an integer; and
   wherein the minimum value is provided to a decoder so that the decoder can recover the minimum value.

2. The method of claim 1, wherein the region is formed by dividing the picture of the reconstructed, deblocked reconstructed, or deblocked-and-loop-filtered reconstructed video data using block-based partitioning or quadtree partitioning.

3. The method of claim 1, wherein said determining a class for each of pixels in the region comprises dividing pixel intensity into N non-uniform bands, wherein N is an integer.

4. The method of claim 1, wherein said determining a class for each of pixels in the region comprises selectively dividing pixel intensity into N non-uniform bands or M uniform bands and providing a flag to a decoder to indicate whether the N non-uniform bands or the M uniform bands is selected wherein N and M are integers.

5. The method of claim 1, wherein the minimum value is derived from the reconstructed, deblocked reconstructed, or deblocked-and-loop-filtered reconstructed video data.

6. A method for adaptive offset processing of reconstructed, deblocked reconstructed, or deblocked-and-loop-filtered reconstructed video data, the method comprising:
- receiving the reconstructed, deblocked reconstructed, or deblocked-and-loop-filtered reconstructed video data;
- selecting a region for the reconstructed, deblocked reconstructed, or deblocked-and-loop-filtered reconstructed video data;
- determining a class for each of pixels in the region of the reconstructed, deblocked reconstructed, or deblocked-and-lop-filtered reconstructed video data based on characteristic measurement of said each of the pixels;
- determining intensity offset for the class according to the pixels in the region of the reconstructed, deblocked reconstructed, or deblocked-and-loop-filtered reconstructed video data and respective pixels in a respective region of associated original video data; and
- compensating intensities of the pixels in the region of the reconstructed, deblocked reconstructed, or deblocked-and-lop-filtered reconstructed video data based on the intensity offset for the class; and
- wherein said determining a class for each of pixels in the region comprises dividing pixel intensity into N bands, providing information about M bands not subject to offset correction, and providing the intensity offset for each of (N–M) bands, wherein N and M are integers and M is smaller than or equal to N.

7. A method for adaptive offset processing of reconstructed, deblocked reconstructed, or deblocked-and-loop-filtered reconstructed video data, the method comprising:
- receiving the reconstructed, deblocked reconstructed, or deblocked-and-loop-filtered reconstructed video data;
- selecting a region for the reconstructed, deblocked reconstructed, or deblocked-and-lop-filtered reconstructed video data;
- determining a class for each of pixels in the region of the reconstructed, deblocked reconstructed, or deblocked-and-loop-filtered reconstructed video data based on characteristic measurement of said each of the pixels;
- determining intensity offset for the class according to the pixels in the region of the reconstructed, deblocked reconstructed, or deblocked-and-loop-filtered reconstructed video data and respective pixels in a respective region of associated original video data; and
- compensating intensities of the pixels in the region of the reconstructed, deblocked reconstructed, or deblocked-and-loop-filtered reconstructed video data based on the intensity offset for the class;
- wherein said determining a class for each of pixels in the region comprises selecting a pixel pattern and providing a flag to a decoder to indicate the pixel pattern selected, wherein the pixel pattern is used for characteristic measurement.

8. The method of claim 7, the characteristic measurement is related to an edge, a valley, a peak or none at said each pixel.

9. The method of claim 7, wherein the pixel pattern is selected from a group consisting of a cross, a diagonal cross, a vertical line, a horizontal line, a 45° line, a 135° line and any combination thereof.

10. A method for adaptive offset processing of reconstructed, deblocked reconstructed, or deblocked-and-loop-filtered reconstructed video data, the method comprising:
- receiving the reconstructed, deblocked reconstructed, or deblocked-and-loop-filtered reconstructed video data;
- selecting a region for the reconstructed, deblocked reconstructed, or deblocked-and-loop-filtered reconstructed video data;
- determining a class for each of pixels in the region of the reconstructed, deblocked reconstructed, or deblocked-and-loop-filtered reconstructed video data based on characteristic measurement of said each of the pixels;
- determining intensity offset for the class according to the pixels in the region of the reconstructed, deblocked reconstructed, or deblocked-and-loop-filtered reconstructed video data and respective pixels in a respective region of associated original video data; and
- compensating intensities of the pixels in the region of the reconstructed, deblocked reconstructed, or deblocked-and-loop-filtered reconstructed video data based on the intensity offset for the class;
- wherein the characteristic measurement of said each of the pixels is selected from a group consisting of coding unit modes, prediction unit sizes, transform unit sizes, quantization parameters, reference pictures, motion vectors, intra prediction modes, residues, and deblocking boundary strengths.

11. An apparatus for adaptive offset processing of reconstructed, deblocked reconstructed, or deblocked-and-loop-filtered reconstructed video data, the apparatus comprising:
- an interface to receive the reconstructed, deblocked reconstructed, or deblocked-and-loop-filtered reconstructed video data;
- a configuration unit to configure a region for the reconstructed, deblocked reconstructed, or deblocked-and-loop-filtered reconstructed video data;
- a first processing unit to determine a class for each of pixels in the region of the reconstructed, deblocked reconstructed, or deblocked-and-loop-filtered reconstructed video data based on characteristic measurement of said each of the pixels;
- a second processing unit to determine intensity offset for the class according to the pixels in the region of the reconstructed, deblocked reconstructed, or deblocked-and-loop-filtered reconstructed video data and respective pixels in a respective region of associated original video data; and
- a third processing unit to compensate intensities of the pixels in the region of the reconstructed, deblocked reconstructed, or deblocked-and-loop-filtered reconstructed video data based on the intensity offset for the class;
- wherein said determining a class for each of pixels in the region comprises selecting a pixel pattern and providing a flag to a decoder to indicate the pixel pattern selected, wherein the pixel pattern is used for characteristic measurement.

12. A method for decoding of a video bitstream, wherein reconstructed video pictures corresponding to the video bitstream are reconstructed, deblocked reconstructed, or deblocked-and-loop-filtered reconstructed by adaptive offset, the method comprising:
- processing the video bitstream to reconstruct video pictures and to provide reconstructed, deblocked reconstructed, or deblocked-and-loop-filtered reconstructed video pictures;
- selecting a region for the reconstructed, deblocked reconstructed, or deblocked-and-loop-filtered reconstructed video pictures;
- determining a class for each of pixels in the region of the reconstructed, deblocked reconstructed, or deblocked-and-loop-filtered reconstructed video pictures based on characteristic measurement of said each of the pixels;
- determining intensity offset for the class as indicated in the video bitstream; and compensating intensities of the pixels in the region of the reconstructed, deblocked reconstructed, or deblocked-and-loop-filtered reconstructed video pictures based on the intensity offset for the class; and wherein said determining a class for each of pixels in the region comprises dividing pixel intensity into N bands between a minimum value and a maximum value, wherein N is an integer.

13. The method of claim 12, wherein the minimum value is indicated in the video bitstream.

14. A method for decoding of a video bitstream, wherein reconstructed video pictures corresponding to the video bitstream are reconstructed, deblocked reconstructed, or deblocked-and-loop-filtered reconstructed by adaptive offset, the method comprising:

processing the video bitstream to reconstruct video pictures and to provide reconstructed, deblocked reconstructed, or deblocked-and-loop-filtered reconstructed video pictures;

selecting a region for the reconstructed, deblocked reconstructed, or deblocked-and-loop-filtered reconstructed video pictures;

determining a class for each of pixels in the region of the reconstructed, deblocked reconstructed, or deblocked-and-loop-filtered reconstructed video pictures based on characteristic measurement of said each of the pixels;

determining intensity offset for the class as indicated in the video bitstream; and compensating intensities of the pixels in the region of the reconstructed, deblocked reconstructed, or deblocked-and-loop-filtered reconstructed video pictures based on the intensity offset for the class;

wherein said determining a class for each of pixels in the region comprises dividing pixel intensity into N bands, providing information about M bands not subject to offset correction, and providing the intensity offset for each of (N−M) bands, wherein N and M are integers and M is smaller than or equal to N.

15. A method for decoding of a video bitstream, wherein reconstructed video pictures corresponding to the video bitstream are reconstructed, deblocked reconstructed, or deblocked-and-loop-filtered reconstructed by adaptive offset, the method comprising:

processing the video bitstream to reconstruct video pictures and to provide reconstructed, deblocked reconstructed, or deblocked-and-loop-filtered reconstructed video pictures;

selecting a region for the reconstructed, deblocked reconstructed, or deblocked-and-loop-filtered reconstructed video pictures;

determining a class for each of pixels in the region of the reconstructed, deblocked reconstructed, or deblocked-and-loop-filtered reconstructed video pictures based on characteristic measurement of said each of the pixels;

determining intensity offset for the class as indicated in the video bitstream; and compensating intensities of the pixels in the region of the reconstructed, deblocked reconstructed, or deblocked-and-loop-filtered reconstructed video pictures based on the intensity offset for the class;

wherein said determining a class for each of pixels in the region comprises extracting a flag from the video bitstream and selecting a pixel pattern according to the flag, wherein the pixel pattern is used for characteristic measurement.

16. The method of claim 15, the characteristic measurement is related to an edge, a valley, a peak or none at said each pixel.

17. The method of claim 15, wherein the pixel pattern is selected from a group consisting of a cross, a diagonal cross, a vertical line, a horizontal line, a 45° line, a 135° line and any combination thereof as indicated in the video bitstream.

18. The method of claim 12, wherein the characteristic measurement of said each of the pixels is selected from a group consisting of coding unit modes, prediction unit sizes, transform unit sizes, quantization parameters, reference pictures, motion vectors, intra prediction modes, residues, and deblocking boundary strengths.

19. An apparatus for decoding of a video bitstream, wherein reconstructed video pictures corresponding to the video bitstream are reconstructed, deblocked reconstructed, or deblocked-and-loop-filtered reconstructed by adaptive offset, the apparatus comprising:

a first processing unit to reconstruct video pictures from the video bitstream and to provide reconstructed, deblocked reconstructed, or deblocked-and-loop-filtered reconstructed video pictures;

a configuration unit to configure a region for the reconstructed, deblocked reconstructed, or deblocked-and-loop-filtered reconstructed video pictures;

a second processing unit to determine a class for each of pixels in the region of the reconstructed, deblocked reconstructed, or deblocked-and-loop-filtered reconstructed video pictures based on characteristic measurement of said each of the pixels;

a third processing unit to determine intensity offset for the class as indicated in the video bitstream; and a fourth processing unit to compensate intensities of the pixels in the region of the reconstructed, deblocked reconstructed, or deblocked-and-loop-filtered reconstructed video pictures based on the intensity offset for the class; and wherein said determining a class for each of pixels in the region comprises selecting a pixel pattern and providing a flag to a decoder to indicate the pixel pattern selected, wherein the pixel pattern is used for characteristic measurement.

20. The method of claim 1, wherein the region is smaller than a picture.

21. The method of claim 12, wherein the region is smaller than a picture.

22. The method of claim 6, wherein the region is formed by dividing the picture of the reconstructed, deblocked reconstructed, or deblocked-and-loop-filtered reconstructed video data using block-based partitioning or quadtree partitioning.

23. The method of claim 6, wherein the region is smaller than a picture.

24. The method of claim 7, wherein the region is formed by dividing the picture of the reconstructed, deblocked reconstructed, or deblocked-and-loop-filtered reconstructed video data using block-based partitioning or quadtree partitioning.

25. The method of claim 7, wherein the region is smaller than a picture.

26. The method of claim 10, wherein the region is formed by dividing the picture of the reconstructed, deblocked reconstructed, or deblocked-and-loop-filtered reconstructed video data using block-based partitioning or quadtree partitioning.

27. The method of claim 10, wherein the region is smaller than a picture.

28. The method of claim 12, wherein the region is smaller than a picture.

29. The method of claim 14, wherein the characteristic measurement of said each of the pixels is selected from a group consisting of coding unit modes, prediction unit sizes, transform unit sizes, quantization parameters, reference pictures, motion vectors, intra prediction modes, residues, and deblocking boundary strengths.

30. The method of claim 14, wherein the region is smaller than a picture.

31. The method of claim 15, wherein the characteristic measurement of said each of the pixels is selected from a group consisting of coding unit modes, prediction unit sizes, transform unit sizes, quantization parameters, reference pictures, motion vectors, intra prediction modes, residues, and deblocking boundary strengths.

32. The method of claim 15, wherein the region is smaller than a picture.

* * * * *